United States Patent
Okamoto

[15] 3,650,575
[45] Mar. 21, 1972

[54] ANTISKID DEVICE
[72] Inventor: Atutoshi Okamoto, Toyohashi, Japan
[73] Assignee: Nippondenso Kabushiki Kaisha, Showa-cho, Kariya-shi, Aichi-ken, Japan
[22] Filed: Apr. 13, 1970
[21] Appl. No.: 27,831

[30] Foreign Application Priority Data
  Apr. 14, 1969  Japan....................................44/28817

[52] U.S. Cl..........................303/21 CF, 188/181 C, 303/20, 303/61, 317/5, 324/161
[51] Int. Cl. .......................................................B60t 8/08
[58] Field of Search ........................188/181; 303/20, 21, 61; 307/120; 317/5; 324/161; 340/263

[56]  References Cited
  UNITED STATES PATENTS

| | | | |
|---|---|---|---|
| 3,245,213 | 4/1966 | Thompson et al. | 303/21 EB |
| 3,260,555 | 7/1966 | Packer | 303/21 EB |
| 3,026,148 | 3/1962 | Ruof | 303/21 CG |
| 3,467,443 | 9/1969 | Okamoto et al. | 303/21 BE |
| 3,398,995 | 8/1968 | Martin | 303/21 BE |

Primary Examiner—Milton Buchler
Assistant Examiner—Stephen G. Kunin
Attorney—Cushman, Darby & Cushman

[57] ABSTRACT

An anti-skid device for automobiles comprising apparatus for converting the wheel speed into a DC voltage, apparatus for producing from the output of said converter a first wheel speed voltage and a second wheel speed voltage higher than said first wheel speed voltage, a capacitor adapted to be charged by said first wheel speed voltage, a discharging circuit for discharging the charge in said capacitor with a time constant corresponding to a preset reference wheel speed, a braking force release unit, switch apparatus for controlling the operation of said braking force release unit, an actuating apparatus consisting of a voltage comparator circuit and an amplifier circuit for actuating said switch apparatus, and a pulse generating circuit for producing pulses to control the actuating apparatus.

9 Claims, 11 Drawing Figures

Patented March 21, 1972

INVENTORS
ATUTOSHI OHMOTO

BY Cushman, Darby & Cushman
ATTORNEYS

Patented March 21, 1972

INVENTOR

ATUTOTSHI ...

BY *Cushman, Darby & Cushman*
ATTORNEYS

ANTISKID DEVICE

BACKGROUND OF THE INVENTION

1. Field of the Invention

The present invention relates to an antiskid device designed to prevent, among others, the skidding of a vehicle with locked wheels, the uncontrollability of a steering wheel and the abnormal spinning of the car body due to the locking of wheels under excessive braking force that may be induced when the wheels are quickly braked while the vehicle is running on a road surface, such as a snowy frozen road surface where the friction coefficient between the wheel and the road surface is small.

2. Description of the Prior Art

The purpose of the conventional devices of this kind has concerned a problem of how to slow down the speed of the vehicle without locking the wheels when the vehicle is braked. Accordingly, most of these conventional antiskid devices have been so designed that the peripheral wheel deceleration is either mechanically or electrically detected, whereupon the instant this peripheral deceleration exceeds a preset value, the braking force applied to the wheels is forcedly released to prevent the locking of wheels irrespective of whether or not the driver of the vehicle intentionally releases the braking force, to thereby prevent the skidding of the vehicle due to the locked wheels, uncontrollability of the steering wheel and extraordinary spinning of the vehicle.

However, with the conventional devices described above, if a preset value for detecting the peripheral deceleration of the wheel is set to suit the conditions on a road, such as a dry concrete-paved road surface where the coefficient of friction is large, only when the vehicle is quickly braked on the road surface of such a high coefficient of friction, braking of the vehicle can be efficiently and safely performed with its wheels continuing to rotate until just before the vehicle comes to a standstill and with a stopping distance shorter than in a case where the vehicle is braked with its wheels being locked. However, if the aforesaid preset value were left unchanged and the brakes were quickly applied to the vehicle on a road such as a snowy frozen road surface where the friction coefficient is small, the wheels would be locked while the vehicle body is still moving, thus resulting in the skidding of the vehicle and the uncontrollability of the steering wheel which would be very dangerous. Indeed, the wheels would not be locked, even though the vehicle were quickly braked on a road where the friction coefficient is small, if the aforesaid preset value were determined in terms of a road surface with a small coefficient of friction, such as a snowy frozen road surface. On the other hand, however, this gives rise to a problem that the application of the brakes on a road surface with a large coefficient of friction will release more braking force than is actually required with the result that the stopping distance is considerably extended and hence the merit of installation of the antiskid device is lost entirely.

SUMMARY OF THE INVENTION

In order to solve the above-mentioned problems, it is the object of the present invention to provide an antiskid device wherein the wheel speed is converted into a DC voltage from which are derived a first wheel speed voltage and a second wheel speed voltage higher than said first voltage, and a capacitor is charged by said first wheel speed voltage, whereby when said first wheel speed voltage becomes lower than the voltage across the capacitor the charge in the capacitor is discharged with a time constant corresponding to a preset reference wheel deceleration and simultaneously a signal in the form of a pulse is generated to actuate a braking force release unit, and when both the first and second wheel speed voltages become lower than the voltage across the capacitor the signal for actuating the braking force release unit is continuously generated and simultaneously the discharging time constant of the said capacitor is made longer, whereupon the vehicle may be efficiently and safely brought to a complete standstill within the shortest possible stopping distance and without locking the wheels on various road surfaces including a snowy frozen road surface where the friction coefficient is small and a dry concrete-paved road surface where the friction coefficient is large.

According to the present invention greater effectiveness is achieved in that since the wheel speed is converted into a DC voltage from which are derived a first wheel speed voltage and a second (or a second and a third) wheel speed voltage higher than said first voltage and a capacitor is charged by the first wheel speed voltage so that when the first wheel speed voltage becomes lower than the voltage across the capacitor the charge in the capacitor is discharged with a time constant corresponding to a preset reference wheel deceleration and simultaneously a signal in the form of a pulse is generated so as to actuate a braking force release unit, if only the first wheel speed voltage drops below the voltage across the capacitor as will be the case when the brakes are quickly applied on a road such as a dry asphalt road surface with a large coefficient of friction, as previously described, the signal in the form of a pulse is generated to actuate the braking force release unit to ensure that the braking force applied to the wheels is intermittently and gradually released to effect the braking of the vehicle in a very confortable manner and that no more braking fore than actually required is released so that the stopping distance can be made considerably shorter as compared with the case where the vehicle is braked with the wheels being locked. On the other hand, at the same time that both the first and second wheel speed voltages drop lower than the voltage across the capacitor the said signal in the form of a pulse, but having a shorter pulse interval is generated to actuate the braking force release unit, and thus if both the first and second wheel speed voltages become lower than the voltage across the capacitor as will be the case when the brakes are quickly applied on a road, such as a road surface wet with rain where the friction coefficient is relatively small, the braking force may be intermittently and gradually released at shorter intervals so as not to release the braking force unnecessarily and therefore the stopping distance will be considerably shorter as compared when the vehicle is braked with the wheels locked.

According to the present invention there is another remarkable effect in that since the signal for actuating the braking force release unit is continuously generated and simultaneously the discharging time constant of the capacitor is made longer when all of the first, second and third wheel speed voltages become lower than the voltage across the capacitor, the instant the first, second and third wheel speed voltages drop all together below the voltage across the capacitor as will occur when a quick braking operation is effected on a road with a small coefficient of friction such as a snowy frozen road surface, as described above, the pulse for actuating the braking force release unit is continuously generated so that the braking force applied to the wheels is continuously decreased to almost zero and simultaneously the discharging time constant of the capacitor, i.e., the reference wheel deceleration is set to a lower value to suit the conditions on a road surface where the friction coefficient is small, whereby the wheels are prevented from being locked while the vehicle body is still running, but are permitted to continue rotating until just before the vehicle is brought to a complete standstill and the stopping distance is remarkably shortened as compared to that which is possible when the vehicle is braked with the wheels being locked.

The above and other objects, features and advantages will be more apparent by the description of the preferred embodiments of the present invention taken in conjunction with the accompanying drawings.

DESCRIPTION OF THE PREFERRED EMBODIMENTS

Figure 1:
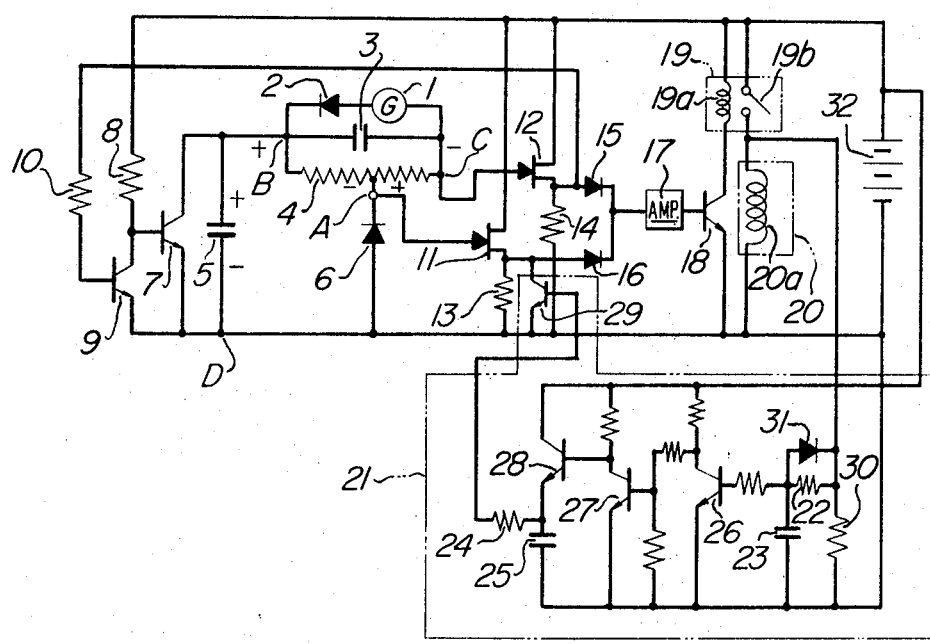
FIG. 1 is a wiring diagram showing an embodiment of the antiskid device according to the present invention.

The present invention will now be explained in conjunction with the illustrated embodiments. Referring to FIG. 1, numeral 1 designates an AC generator which is coupled with an axle shaft or the like correlated with the wheel speed and which produces an AC voltage proportional to the wheel speed. Numeral 2 designates a rectifier diode for rectifying the AC voltage; 3 a smoothing capacitor; 4 a load resistor of the AC generator 1 which is provided with a center tap A and that also performs a smoothing function. Numeral 5 designates a capacitor adapted to be charged by a DC voltage (hereinafter simply referred to as a first wheel speed voltage) which is developed between one end B (hereinafter simply referred to as a point B) of the load resistor 4 and the center tap A (hereinafter simply referred to as a point A), and numeral 6 designates a diode which constitutes an element of the charging circuit of the capacitor 5 and whose negative side is connected to the center tap A. Numeral 7 designates a transistor constituting the discharging circuit of the capacitor 5 so that the charge in the capacitor 5 is discharged with a time constant corresponding to a predetermined reference wheel deceleration of 1.0 g (where g is the acceleration due to gravity), for example. Numeral 8 designates a base resistor of the transistor 7, which determines the value of the collector current of transistor 7, i.e., the discharging time constant of the capacitor 5. Further, the discharging characteristic curve of the capacitor 5 represents a reference wheel speed that slows down with a preset reference wheel deceleration and the momentary terminal voltage of the capacitor 5 upon discharging thereof represents the reference wheel speed voltage. Numeral 9 designates a transistor connected between the base and emitter of the transistor 7 and causes the collector current of the transistor 7 to change in a diminishing direction to make the discharging time constant of the capacitor 5 longer, and numeral 10 designates the base resistor of the transistor 9. In other words, it is arranged such that when the transistor 9 is driven toward the saturation region (conduction state) with the capacitor 5 discharging with a time constant corresponding to the peripheral wheel deceleration of 1.0 g, a portion of the current that was flowing to the base of the transistor 7 through the base resistor 8 now flows to the collector of the transistor 9 up to an amount as determined by the base resistor 10, with the result that the base current and hence the collector current of the transistor 7 decrease, thus making the time constant of the capacitor 5 longer, that is, the preset reference wheel deceleration is reduced, for example, from 1.0 g to 0.1 g, Numeral 11 designates a field effect transistor (hereinafter simply referred to as a FET) whose gate is connected to the center tap A of the resistor 4. Numeral 12 designates a FET having its gate connected to an end C (hereinafter simply referred to as a point C). of the resistor 4 and its source connected to the end of the resistor 10. Numerals 13 and 14 designate load resistors connected to the sources of FET 11 and FET 12, respectively. Numerals 15 and 16 designate diodes connected to the respective sources of the FET 11 and FET 12, and these diodes form a kind of OR circuit to prevent FET 11 and FET 12 from interfering with each other. Numeral 17 designates an amplifier circuit operated by the output signals from FET 11 and FET 12 to amplify these output signals. Numeral 18 designates a transistor connected to the output terminal of the amplifier circuit 17 and having its collector connected to a relay winding 19a of a relay circuit 19, and numeral 19b designates a normally open contact. Numeral 20 designates a braking force release unit showing only its exciting coil 20a which is in turn connected to the normally open contact 19b of the relay circuit 19 so that energization of the exciting coil 20a results in a forced release of the braking force applied to the wheels, irrespective of whether the driver of the vehicle releases it or not, while on the other hand deenergization of this exciting coil permits the driver to freely apply the braking force to the wheels at will and independently of the present antiskid device. Numeral 21 designates a pulse generator operated by the output from the relay circuit 19 to apply to the amplifier circuit 17 and the succeeding stages the output signal from the source of FET 11 in the form of a pulse signal, and the pulse width of this pulse signal is determined by the time constant of a resistor 22 and a capacitor 23 and the pulse interval is determined by the time constant of a resistor 24 and a capacitor 25; numerals 26, 27, 28 and 29 designate switching transistors, and numeral 30 designates a resistor constituting an element of the discharging circuit of the capacitor 23 and having a very low resistance value. Numeral 31 designates a diode which also constitutes an element of the discharging circuit of the capacitor 23. The said transistor 29 is also connected to the ends of the load resistor 13 of FET 11. Numeral 32 designates a DC power source.

With the arrangement described above, the operation of the device according to the present invention will now be explained. During normal driving of the vehicle with the brakes off, the AC generator 1 produces an AC voltage proportional to the wheel speed. This AC voltage is then rectified by the diode 2 and its ripple current is smoothed out by the capacitor 3 and the resistor 4 so that a DC voltage proportional to the wheel speed is produced between the points B and C of the resistor 4. Thus, on the one hand a first wheel speed voltage developed between the points A and B of the resistor 4 charges the capacitor 5 via the diode 6, and on the other hand a current as determined by the resistor 8 is supplied between the collector and emitter of the conducting transistor 7. In addition, the negative potential at the point A side of the first wheel speed voltage developed between the points B and A of the resistor 4 is applied to the gate of FET 11 so that this FET 11 is in its substantially cutoff state and the signal voltage appearing at its source is very low; thus even if this signal voltage were amplified by the amplifier circuit 17, it would not amount to actuate the relay circuit 19. On the other hand, the negative potential at the point C side of a second wheel speed voltage developed between the points B and C of the resistor 4 is applied to the gate of FET 12 so that said FET 12 is completely cut off and hence there is no signal voltage appearing at its source. Thus, the transistor 18 connected to the output terminal of the amplifier circuit 17 is in its cutoff state so that the relay winding 19a of the relay circuit 19 is deenergized and the normally open contact 19b remains in its open position. Consequently, the exciting winding 20a of the braking force release unit 20 is also deenergized and thus the driver can apply at will any braking force to the wheels.

Next, the operation of the device according to the present invention will be explained in conjunction with a vehicle running with the brakes on. Initially, considering the case in which the vehicle is quickly braked on a road such as a dry concrete-paved road surface where the friction coefficient is large, the wheel speed drops with a certain deceleration upon application of the braking force to the wheels, and at the same time the output voltage of the AC generator 1 drops abruptly with a resultant decrease in the DC voltage developed across the resistor 4, that is, the first wheel speed voltage between the points B and A and the second wheel speed voltage between the points B and C. Consequently, as the first wheel speed voltage between the points B and A becomes lower than the voltage across the capacitor 5, the discharging of the charge in the capacitor 5 is initiated at a time constant corresponding to a preset reference wheel deceleration of 1.0 g, for example, through the collector and emitter of the conducting transistor 7 and simultaneously the voltage across the capacitor 5 is applied between the gate and source of FET 11 as a forward bias voltage through the points B and A of the resistor 4. This renders FET 11 conductive producing a signal voltage at the source thereof. On the other hand, the results of tests conducted on the quick braking of the vehicle on a road such as a dry concrete-paved road surface where the friction coefficient is large has shown that the second wheel speed voltage between the points B and C of the resistor 4 does not even drop lower than the voltage across the capacitor 5 and the negative potential at the point C of the second wheel speed voltage between the points B and C is applied to the gate of FET 12 so that FET 12 remains in its cutoff state and no signal voltage appears at its source. Thus, the signal voltage produced at the source of FET 11 is amplified by the amplifier circuit 17 and it is then applied to the base of the transistor 18 to render the latter conductive. With the transistor 18 now conducting, current is supplied to the relay winding 19a of the relay circuit 19 and the normally open contact 19b closes thereby causing a flow of current to the exciting winding 20a of the braking force release unit 20. When this happens, the braking force applied to the wheels is forcedly released, irrespective of whether the driver intentionally releases the braking force or not. Furthermore, at the same time that the exciting coil 20a is energized, current is supplied to the capacitor 23 of the pulse generating circuit 21 through the resistor 22 so that the instant the voltage across the capacitor 23 reaches a value sufficient to attain the conduction level between the base and emitter of the transistor 26, the conduction level is obtained between the collector and emitter of the transistor 26 so that the transistor 27 is cut off and the transistor 28 conducts. Whereupon, the capacitor 25 is charged by the emitter current of the transistor 28 and this emitter current is also supplied to the base of the transistor 29 through the resistor 24 thus rendering the transistor 29 conductive. In consequence of the conduction of the transistor 29, the current caused by the signal voltage developed at the source of FET 11 now flows through the collector and emitter of the transistor 29 and it is not applied to the amplifier circuit 17. This drives the transistor 18 to cutoff and the normally open contact 19b of the relay circuit 19 opens again to cut the supply of current to the exciting coil 20a of the braking force release unit 20. Consequently, the braking force is reapplied to the wheels, since the driver has been applying the braking force to the wheels. Moreover, upon deenergization of the exciting coil 20a the supply of current to the base of the transistor 26 in the pulse generating circuit 21 is shut off thus rendering the transistor 26 nonconductive, whereby the charge in the capacitor 23 is rapidly completely discharged through the diode 31 and the low resistance-value resistor 30. On the other hand, while the transistor 27 conducts and the transistor 28 is cut off subsequent to the non-conduction of the transistor 26, the supply of base current to the transistor 29 is continued for a certain period of time through the resistor 24 by the discharging of the charge in the capacitor 25 so that the transistor 29 remains in its conductive state for a fixed time, that is, until the capacitor 25 is almost completely discharged, and thereafter the transistor 29 is actually cut off. With the transistor 29 now at cutoff, the transistor 18 connected to the output terminal of the amplifier circuit 17 is rendered conductive again by virtue of the signal voltage appearing at the source of FET 11 with the result that the normally open contact 19b of the relay circuit 19 is closed to energize the exciting coil 20a of the braking force release unit 20, whereupon the braking force applied to the wheels is released again and simultaneously the capacitor 23 of the pulse generating circuit 21 starts to store charge. Thereafter, as long as there is the signal voltage at the source of FET 11, that is, the first wheel speed voltage between the points B and A of the resistor 4 remains lower than the voltage across the capacitor 5, the flow of current to the exciting coil 20a of the braking force release unit 20 is supplied in the form of a pulse current by the operation of the pulse generating circuit 21 so that the braking force applied to the wheels is intermittently and gradually released. In this case, its pulse width is determined by the time constant of the resistor 22 and the capacitor 23 in the pulse generating circuit 21, while the pulse interval depends on the time constant of the resistor 24 and the capacitor 25. Then, as the braking force applied to the wheels is intermittently and gradually released, the wheel speed gradually increases with a resultant rise in the output voltage of the AC generator 1 and hence the voltage across the resistor 4. Consequently, the instant the first wheel speed voltage between the points B and A of the resistor 4 becomes higher than the voltage across the capacitor 5, the negative potential at the point A of the resistor 4 is applied to the gate of FET 11 to drive it to cutoff so that the pulse current is no longer supplied to the exciting coil 20a of the braking force release unit 20 and at the same time the capacitor 5 is charged by the first wheel speed voltage until the voltage difference between the voltage across the capacitor 5 and the first wheel speed voltage becomes equal to the forward potential difference across the diode 6. Thus, when the brakes are quickly applied on a road such as a dry asphalt road surface where the friction coefficient is high, a series of operations as described above may be repeated to brake the vehicle in the manner which prevents the locking of wheels and hence skidding of the vehicle.

Figure 2A:
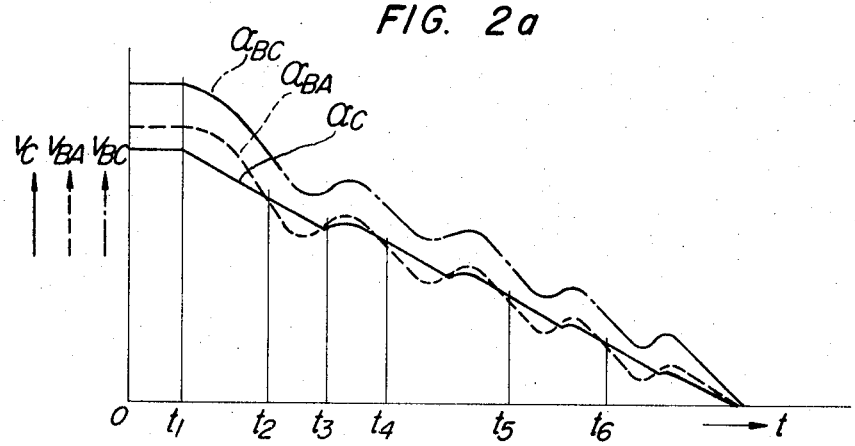
FIGS. 2a to 2c are performance characteristic diagrams for explaining the operation of the device of the embodiment of FIG. 1 when it is operated on a nonslippery road where the friction coefficient is large.
Figure 2B:
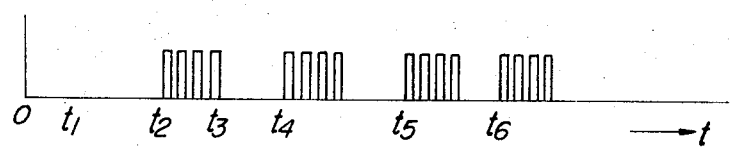
Figure 2C:
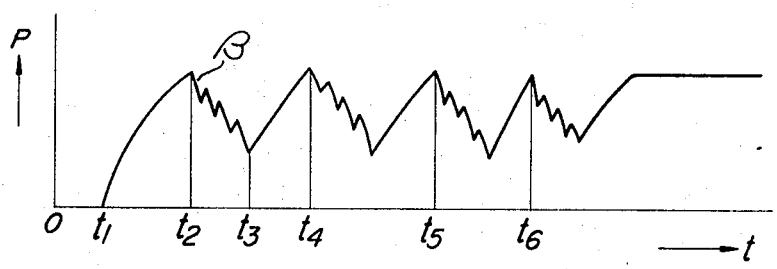

The above-mentioned operations that take place when the brakes are quickly applied on a road with a high coefficient of friction will now be explained in further detail with reference to FIGS. 2a, 2b and 2c in which the time t is correspondingly represented on the respective horizontal axis. More particularly, FIG. 2a is a characteristic diagram showing how the voltage $V_C$ across the capacitor 5 as well as the first wheel speed voltage $V_{BA}$ and the second wheel speed voltage $V_{BC}$ appearing between the points B and A and between the points B and C of the resistor 4, respectively, change with the time t. In this figure the voltage $V_C$ across the capacitor 5 is represented by a curve $\alpha c$, while the first wheel speed voltage $V_{BA}$ is represented by a curve $\alpha_{BA}$ and the second wheel speed voltage $V_{BC}$ by a curve $\alpha_{BC}$. FIG. 2b shows the pulse current supplied to the exciting coil 20a of the braking force release unit 20 in terms of the time t. And FIG. 2c is a characteristic diagram showing the changes in the value of hydraulic pressure P plotted against the time t, the hydraulic pressure P providing the braking force applied to the wheels. In these FIGS. 2a to 2c, when the braking force, i.e., the hydraulic pressure P is applied to the wheels at time $t_1$, the hydraulic pressure P rises with the lapse of time as shown in FIG. 2c by a curve $\beta$ so that the first wheel speed voltage $V_{BA}$ drops as shown by the curve $\alpha_{BA}$.

On the other hand, the voltage $V_C$ across the capacitor 5 drops with a time constant corresponding to a preset reference wheel deceleration of 1.0 g, for example. Then at time $t_2$ when the first wheel speed voltage $V_{BA}$ becomes lower than the voltage $V_C$ across the capacitor 5, the pulse current is supplied to the exciting coil 20a of the braking force release unit 20 as shown in FIG. 2b and the hydraulic pressure P is thus released intermittently so that the hydraulic pressure P gradually decreases in a sawlike manner as shown by the curve $\beta$ in FIG. 2c. Then, as the wheel speed increases with a corresponding rise in the first wheel speed voltage $V_{BA}$ and eventually time $t_3$ is reached when the first wheel speed voltage $V_{BA}$ becomes higher than the voltage $V_C$ across the capacitor 5, the pulse current to be applied to the exciting coil 20a of the braking force release unit 20 is no longer provided and thus the hydraulic pressure P starts to build up again. Thereafter, whenever the first wheel speed voltage $V_{BA}$ becomes once again lower than the terminal voltage $V_C$ of the capacitor 5 at time $t_4$, $t_5$ or $t_6$, for example, the process of operation as described above is repeated. Further, as previously mentioned, the tests conducted have shown that even if the vehicle were quickly braked on a road such as a dry asphalt road surface with a high coefficient of friction, the second wheel speed voltage $V_{BC}$ could hardly become lower than the terminal voltage $V_C$ of the capacitor 5.

In the description to follow, the actions that take place when the vehicle is suddenly braked on a road such as a snowy frozen road surface with a small coefficient of friction will be explained. When the braking force is applied to the wheels, the wheel speed drops with a very large deceleration due to the low friction coefficient of the road surface with a resultant decrease in the voltage across the resistor 4, i.e., the first wheel speed voltage between the points B and A and the second wheel speed voltage between the points B and C of the resistor 4. As a result, only the first wheel speed voltage first becomes lower than the voltage across the capacitor, whereupon similarly as in the previously mentioned case of a road surface with a large coefficient of friction, the pulse current is supplied to the exciting coil 20a of the braking force release unit 20 so that the braking force applied to the wheels is intermittently and gradually released. However, due to the small friction coefficient of the road surface the wheel speed drops further until the second wheel speed voltage between the points B and C of the resistor 4 becomes lower than the voltage across the capacitor 5, whereupon the voltage across the capacitor 5 is applied as a forward bias voltage between the gate and source of FET 12 through the points B and C of the resistor 4 thus rendering FET 12 conductive. Consequently, the signal voltage developed at the source of FET 12 is amplified by the amplifier circuit 17 and it is then applied to the transistor 18 as a base current so that as long as FET 12 remains conducting, that is, as long as the second wheel speed voltage between the points B and C of the resistor 4 remains to be lower than the voltage across the capacitor 5, the transistor 18 is continuously conducted irrespective of the operation of the pulse generating circuit 21. When this happens, current continuously flows through the exciting coil 20a of the braking force release unit 20 and thus the braking force applied to the wheels is continuously released to drop almost to zero. Moreover, at the same time that FET 12 goes into conduction the current caused by the signal voltage developed at the source of FET 12 is supplied to the base of the transistor 9 through the base resistor 10 and the transistor 9 conducts. With the transistor 9 now conducting, a portion of the current that was flowing to the base of the transistor 7 through the base resistor 8 now flows through the collector and emitter of the transistor 9 so that the current flowing through the collector and emitter of the transistor 7 decreases, that is, the discharging time constant of the capacitor 5 is lengthened. In other words, the preset reference wheel deceleration is reduced from 1.0 g to 0.1 g, for example. Then, as previously mentioned, when the braking force applied to the wheels is intermittently and gradually released so that the wheel speed gradually increases and eventually the second wheel speed voltage between the points B and C of the resistor 4 becomes higher than the voltage across the capacitor 5, the negative potential at the point C of the resistor 4 is applied to the gate of FET 12 to cut it off, hence there will be no more continuous current flowing through the exciting coil 20a of the braking force release unit 20. Instead, the pulse current due to the output signal from FET 11 and the action of the pulse generating circuit 21 is supplied to the exciting coil 20a and the transistor 9 is also simultaneously together with FET 12, therefore the discharging time constant of the capacitor 5, that is, the reference wheel deceleration reverts from 0.1 g to the initial value of 1.0 g. Thereafter, as the wheel speed increases still further and the first wheel speed voltage between the points B and A of the resistor 4 eventually becomes higher than the voltage across the capacitor 5, FET 11 is cutoff with the result that also the pulse current is no longer supplied to the exciting coil 20a of the braking force release unit 20, and simultaneously the capacitor 5 is charged by the first wheel speed voltage until the difference voltage between the first wheel speed voltage and the voltage across the capacitor 5 becomes equal to the forward potential difference across the diode 6. Thus, when the brakes are quickly applied on a road such as a snowy frozen road surface where the friction coefficient is small, a series of operations as described above are repeated to thereby brake the vehicle without locking the wheels.

Figure 3A:
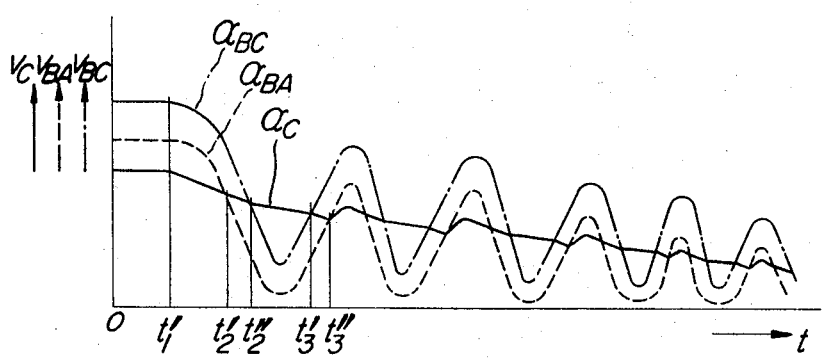
FIGS. 3a to 3c are performance characteristic diagrams for explaining the operation of the device of the embodiment of FIG. 1 when operated on a slippery road where the friction coefficient is small.
Figure 3B:
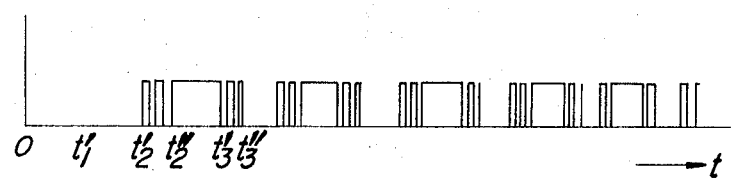
Figure 3C:
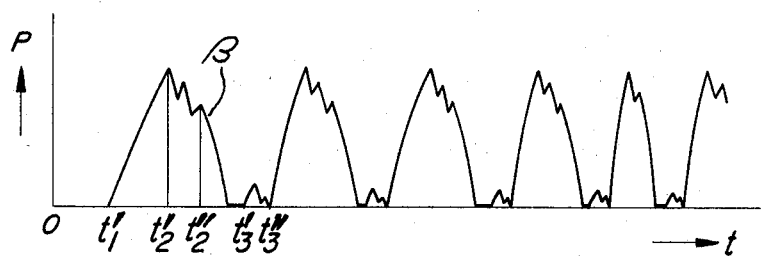

The aforementioned operations that take place when the brakes are quickly applied on a road where the friction coefficient is small will now be explained further in detail with reference to FIGS. 3a to 3c in which the horizontal and vertical axes are similarly drawn as in the previously explained FIGS. 2a to 2c. Now referring to FIGS. 3a to 3c, as the braking force is applied to the wheels at time $t_1'$, the hydraulic pressure P rises as shown by a curve $\beta$ in FIG. 3c so that the first wheel speed voltage $V_{BA}$ and the second wheel speed voltage $V_{BC}$ drop as shown by curves $\alpha_{BA}$ and $\alpha_{BC}$. On the other hand, the voltage $V_C$ across the capacitor 5 decreases with a time constant corresponding to a preset reference wheel deceleration of 1.0 g, for example. Thus, when the first wheel speed voltage $V_{BA}$ becomes lower than the voltage $V_C$ across the capacitor 5 at time $t_2'$, as shown in FIG. 3b, pulse current produced by the action of the pulse generating circuit 21 is supplied to the exciting coil 20a of the braking force release unit 20 and thereby the hydraulic pressure P is intermittently released. Thereafter, as the wheel speed decreases further and hence the second wheel speed voltage $V_{BC}$ becomes lower than the voltage $V_C$ across the capacitor 5 at time $t_2''$, as shown in FIG. 3b, current is continuously supplied to the exciting coil 20a of the braking force release unit 20 so that the hydraulic pressure P is continuously released to drop substantially to zero. This causes the wheel speed to rise again and consequently, as the second wheel speed voltage $V_{BC}$ becomes higher than the terminal voltage of the capacitor 5 at time $t_3'$, that current flowing to the exciting coil 20a of the braking force release unit 20 now takes the form of a pulse current. Then, as the wheel speed becomes still higher and hence the first wheel speed voltage $V_{BA}$ becomes higher than the voltage $V_C$ across the capacitor 5 at time $t_3''$, the pulse current now flowing to the exciting coil 20a is also cut off and the hydraulic pressure P starts to build up again. Thereafter, the process of operation described above will be repeated to brake the vehicle without inducing locking of the wheels.

Figure 4:
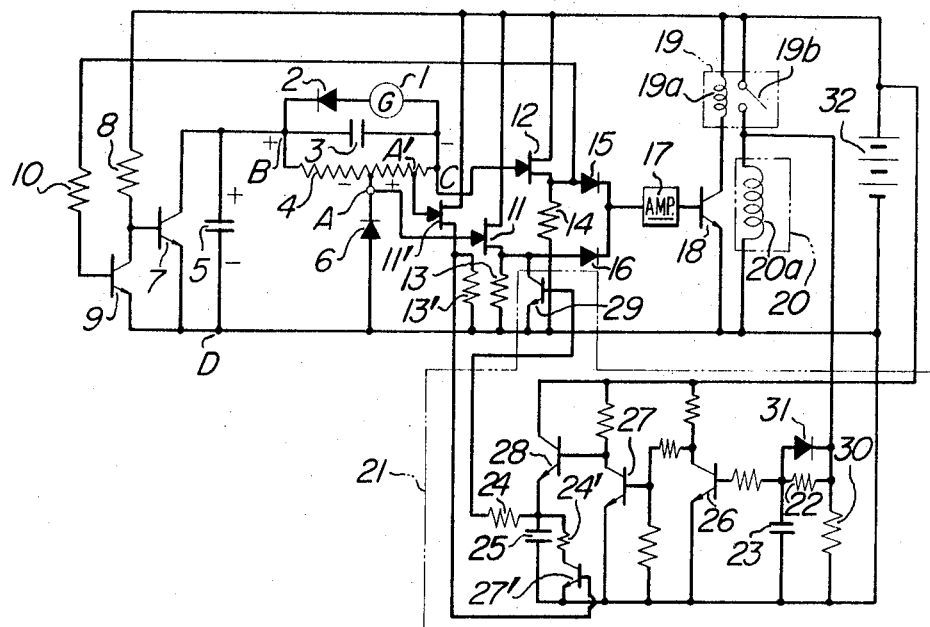
FIG. 4 is a wiring diagram showing another embodiment of the antiskid device according to the present invention.

Now referring to FIG. 4 there is shown another embodiment of the device of the present invention. The device according to the present embodiment is realized by additionally incorporating a FET and a transistor in the circuit of the previously stated embodiment. In FIG. 4, the gate of FET 11' is connected to a tap A' of a resistor 4, while the source of FET 11' is connected to one end of a load resistor 13'. The collector of a switching transistor 27' is connected through a resistor 24' to a junction point of the emitter of a transistor 28, a capacitor 25 and a resistor 24, while the emitter of transistor 27' is connected to the other end of the capacitor 25 and the base of transistor 27' is connected to the source of FET 11'. With the arrangement just described, the operation of the device of the present embodiment will be explained below.

The application of braking force to the wheels causes the wheel speed to decrease with a certain deceleration and at the same time the output voltage of an AC generator 1 suddenly drops so that a DC voltage developed across the resistor 4, that is, voltages developed between points B and A, B and A', and B and C, respectively, drop. As the speed voltage between the points B and A becomes lower than the voltage across the capacitor 5, the same operations as previously explained take place. Then, as far as the speed voltage between the points B and A' remains higher than the voltage across the capacitor 5, the negative potential at the point A' side is applied to the gate of FET 11' so that FET 11a is substantially driven to the cutoff point.

Figure 5A:
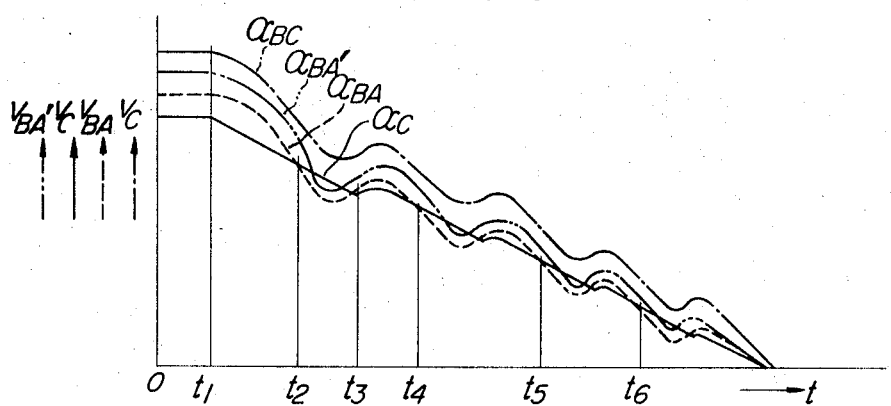
FIGS. 5a to 5c are performance characteristic diagrams for explaining the operation of the device of the embodiment shown in FIG. 4.
Figure 5B:
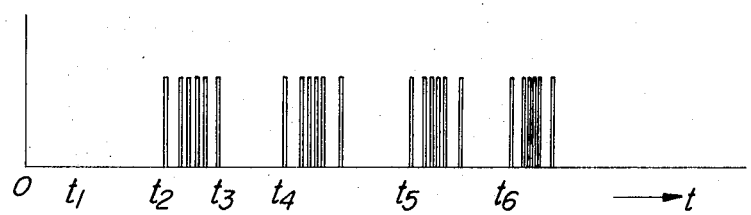
Figure 5C:
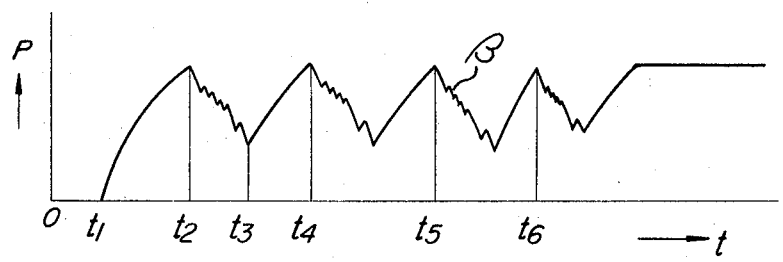

As the wheel speed decreases further and hence the speed voltage $V_{BA}'$ represented by a curve $\alpha_{BA}'$ between the points B and A' becomes lower than the voltage across the capacitor 5 represented by a curve $\alpha_C$ in FIG. 5a, the voltage across capacitor 5 is applied as a forward bias voltage between the gate and source of FET 11'. This renders FET 11' and hence the transistor 27' conductive and the resistor 24' is now connected in parallel with the resistor 24 with the result that the pulse interval which has been determined by the time constant of the resistor 24 and the capacitor 25 is now determined by the time constant of the resistors 24 and 24' and the capacitor 25 and the pulse interval is thus reduced. Consequently, as shown in FIGS. 5b and 5c, pulse current having a pulse interval shorter than before is now supplied to the exciting coil 20a of the braking force release unit 20 so that the braking force applied to the wheels is released at shorter intervals than before to thereby brake the vehicle without inducing locking of the wheels. Then, on a road such as a snowy frozen road surface where the friction coefficient is small, it is possible that the wheel speed drops still further and eventually the wheel speed voltage between the points B and C becomes lower than the voltage across the capacitor 5. In this case, the operation of the device of the present embodiment is identical to that of the first embodiment device.

According to the device of the present invention, greater effectiveness is achieved in that when the vehicle is quickly braked on various road surfaces where the coefficients of friction between the wheel and the road surfaces range from 1.0 g to 0.08 g, in terms of wheel decelerations, the wheels continue to rotate just before the vehicle is brought to a complete stop and in these cases the stopping distances are considerably shorter than when the vehicle is braked with the wheels being locked.

I claim:

1. An antiskid device for automobiles comprising:
    means for detecting a wheel speed,
    means connected to the output of said means for detecting for producing at least two wheel speed signals, each corresponding to one of a plurality of wheel speed levels of the detected wheel speed,
    means for at least temporarily storing one of said wheel speed signals,
    means for converting said one stored signal into a preset wheel speed signal corresponding to a preset wheel speed,
    a braking force release unit,
    switch means for controlling the operation of said braking force release unit,
    an actuating circuit for actuating said switch means and comprising a signal comparator circuit means connected to compare said wheel speed signals with said preset wheel speed signal and an amplifier circuit connected to the output of said comparator, and
    a pulse generating circuit means connected to said signal comparator circuit means for producing pulses to control said actuating circuit, whereby, when said wheel speed signals of different levels reach signal voltage values corresponding to the preset wheel speeds, said actuating circuit intermittently closes said switch means at different intervals respectively corresponding to the different wheel speed signal levels so that ultimately said actuating circuit continuously closes said switch means when all of said wheel speed signals are less than the preset wheel speed signal.

2. An antiskid device for automobiles according to claim 1, wherein the signal voltage value corresponding to the preset wheel speed is varied in relation to wheel speed signals of different levels.

3. An antiskid device for automobiles comprising:
    means for converting a wheel speed into a DC voltage,
    means for producing from the output of said means for converting, a first wheel speed voltage and a second wheel speed voltage higher than said first wheel speed voltage, both being proportional to the DC voltage,
    a capacitor connected for charging by said first wheel speed voltage,
    a discharging circuit connected for discharging the charge in said capacitor with a time constant corresponding to a preset reference wheel speed,
    a braking force release unit,
    switch means for controlling the operation of said braking force release unit,
    an actuating means connected for actuating said switch means and comprising a voltage comparator circuit means for comparing said first and said second wheel speed voltages with the voltage across said capacitor and an amplifier circuit connected to the output thereof, and
    a pulse generating circuit means connected to said comparator means for generating pulses to control said actuating means, whereby said actuating means intermittently closes said switch means at regular intervals when said first wheel speed voltage becomes lower than the voltage across said capacitor, and said actuating means continuously closes said switch means when said second wheel speed voltage also becomes lower than the voltage across said capacitor.

4. An antiskid device for automobiles according to claim 3, wherein the time constant of said discharging circuit is lengthened when said second wheel speed voltage becomes lower than the voltage across said capacitor.

5. An antiskid device for automobiles according to claim 3, wherein said pulse generating circuit means comprises:
    a plurality of switching transistors,
    a discharging circuit for determining the pulse width, and
    another discharging circuit for determining the pulse interval.

6. An antiskid device for automobiles comprising means for converting a wheel speed into a DC voltage, means for producing from the output of said converter means a first wheel speed voltage, a second wheel speed voltage which is higher than said first wheel speed voltage and a third wheel speed voltage which is higher than said second wheel speed voltage, a capacitor adapted to be charged by said first wheel speed voltage, a discharging circuit for discharging the charge in said capacitor with a time constant corresponding to a preset reference wheel speed, a braking force release unit, switch means for controlling the operation of said braking force release unit, actuating means consisting of a comparator circuit and an amplifier circuit for producing a pulse to actuate said switch means, and a pulse generating circuit for producing pulses to control said actuating means, whereby said actuating means intermittently closes said switch means at regular intervals when said first wheel speed voltage becomes lower than the voltage across said capacitor, said actuating means intermittently closes said switch means at shorter intervals when said second wheel speed voltage becomes lower than the voltage across said capacitor, and said actuating means continuously closes said switch means when said third wheel speed voltage becomes lower than the voltage across said capacitor.

7. An antiskid device for automobiles according to claim 6, wherein the time constant of said discharging circuit is lengthened when said third wheel speed voltage becomes lower than the voltage across said capacitor.

8. An antiskid device for motor vehicles, having braking force releasing means comprising:
    means for providing first and second DC voltages which are each proportional to a wheel speed of said vehicle, said first DC voltage being lower than said second DC voltage;
    means for producing a reference voltage derived from said first DC voltage, said reference voltage being discharged with a preset time constant;
    means for actuating said braking force releasing means intermittently when said reference voltage exceeds said first DC voltage and continuously when said reference voltage also exceeds said second DC voltage.

9. An antiskid device for motor vehicles as in claim 8 further including means for changing said preset time constant when said reference voltage exceeds said second DC voltage.

* * * * *